United States Patent [19]
Reilly

[11] Patent Number: 4,924,711
[45] Date of Patent: May 15, 1990

[54] FORCE TRANSDUCERS FOR USE IN ARRAYS

[75] Inventor: Robert E. Reilly, London, England

[73] Assignee: National Research Development Corporation, London, United Kingdom

[21] Appl. No.: 308,676

[22] Filed: Feb. 10, 1989

[51] Int. Cl.$^5$ .................... G01L 5/16; H03H 9/30; G01R 33/12

[52] U.S. Cl. .................... 73/862.04; 73/862.64; 73/862.69; 324/207.15; 333/148

[58] Field of Search .......... 73/862.04, 862.64, 862.69, 73/DIG. 2; 324/207, 208, 209; 333/148

[56] References Cited

U.S. PATENT DOCUMENTS

| | | | |
|---|---|---|---|
| 3,517,343 | 6/1970 | Crim | 333/148 |
| 4,028,619 | 6/1977 | Edwards | 333/148 X |
| 4,298,861 | 11/1981 | Tellerman | 333/148 X |
| 4,344,068 | 8/1982 | Thompson et al. | 333/148 X |
| 4,481,821 | 11/1984 | Chamuel | 73/643 |
| 4,526,043 | 7/1985 | Boie et al. | 73/862.04 |
| 4,598,595 | 7/1986 | Vranishi et al. | |

FOREIGN PATENT DOCUMENTS

2519012 11/1976 Fed. Rep. of Germany .

OTHER PUBLICATIONS

"Magnetic Sensors of New Materials" by R. Boll et al., 1981, pp. 83–90.
Poster Presentation by Dr. Reilly, 1988 (11 sheets).
"A Magnetoacoustic Keyboard" by Worthington et al., 1979 Engineering Technology, 7 pages.
"Magnetic Shielding to Multi-Gigawatt Magnetic Switches Ten Years of Amorphous Magnetic Applications" by Smith—IEEE Transactions on Magnetics, vol. MAG-18, No. 6, 1982, pp. 1376–1381.
"An Amorphous Magnetostrictive Delayline Cordless Digitizer" by Murakami, IEEE Trans. Magnetics, vol. 24, No. 2, 1988, pp. 1738–1739.
"New Force Transducers Using Amorphous Ribbon Cores" by Mohri et al., Transactions on Magnetics, vol. MAG-14, No. 5, 1978, pp. 1071–1075.
"Sensitive Force Transducers Using a Single Amorphous Core Multivibrator Bridge" by Mohri et al., IEEE Transactions on Magnetics, vol. MAG-15, No. 6, 1979, pp. 1806–1808.
"Metallic Glasses in Devices for Energy Conversion and Conservation" by Hasegawa, Journal of Non-Crystalline Solids, 61 & 62, 1984, pp. 724–736.
"A New Torque Transducer Using Stress Sensitive Amorphous Ribbons" by Harada et al., IEEE Transactions on Magnetics, vol. MAG-18, No. 6, Nov. 1982, pp. 1767–1769.
"New Extensometers Using Amorphous Magnetostrictive Ribbon Wound Cores" by Mohri et al., IEEE Transactions on Magnetics, vol. MAG-17, No. 3, 1981, pp. 1317–1319.
"A Sonic Delay-Line Storage Unit for Digital Computer" by Fairclough, Proc. IEEE, vol. 103, Part B, Supplement No. 3, 1956, pp. 491–496.
"Wire-Type Acoustic Delay Lines for Digital Storage" by Scarrott et al., Proc. IEEE, vol. 103, Part B, Supplement No. 3, 1956, pp. 497–508.

*Primary Examiner*—Charles A. Ruehl
*Attorney, Agent, or Firm*—Cushman, Darby & Cushman

[57] ABSTRACT

A force transducer is described which uses current pulses in a conductor to generate acoustic pulses in a magnetostrictive delay line. The pulses are sensed by a coil around the line. The magnitude of the pulses is modified by force applied to the transducer either by changing the shielding effect of a magnetoelastic ribbon (between the conductor and the delay line) by applying a force to be sensed thereto, or in another alternative by modifying the distance between the conductor and the delay line in accordance with applied force. The transducers are economic and easily assembled into arrays for sensing stress distribution in two dimensions because the common conductors can be used for the columns of the array and common delay lines can be used for the array rows. Each column then has a common current-pulse generator and each row has a common detector coil. A similar technique may be used for sensing the spatial distribution of other parameters such as temperature, magnetic field or displacement.

24 Claims, 6 Drawing Sheets

FORCE TRANSDUCERS FOR USE IN ARRAYS

The present invention relates to force transducers particularly, but not exclusively, for use in stress arrays providing an indication of load distribution.

There are a large number of applications where it is useful to have an array of transducers which can provide an indication of load distribution. These applications include walkways for use in clinical practice to obtain objective information on the gait characteristics of patients in order to evaluate degrees of disability and to assist in the diagnosis of locomotor disorders and assess response to treatment. Existing systems of this kind are either rather limited in the level of detail that is obtained or the array is limited to an area of the order of 600 cm$^2$. An object of the present invention is to provide a more precise system which increases the sensitivity of diagnosis and has a greatly increased array area but is relatively inexpensive.

In order to make a large load sensitive it is necessary to provide a high number of transducers if a useful resolution is to be obtained. Thus another object of the invention is to provide economical transducers which are particularly suitable for use in such arrays.

There are many fields in which arrays of this type are useful. For example there are several other applications in the medical field: checking pressure distribution between an artificial limb socket and the limb stump, monitoring pressure distribution on beds, seats and wheelchairs, in the study of pressure sores and the design of comfortable appliances. Outside the medical field applications include sports training, computer keyboards, touch sensitive electronic organs, monitoring long term stress in civil engineering structures and in soil mechanics, and tactile surfaces for robotic hands.

According to a first aspect of the present invention there is provided a force transducer comprising a magnetostrictive member which, in operation, acts as an acoustic delay line and is sensitive to changes in magnetic flux, a conductor, means for generating current pulses in the conductor, the conductor being positioned sufficiently close to the magnetostrictive member to cause an acoustic pulse to be launched in the magnetostrictive member each time one of the said current pulses is generated, a force receiving member, modifier means for varying the amplitudes of the acoustic pulses in dependence upon force applied to the force receiving member, and detector means for deriving electrical output signals having values dependent on the amplitudes of the acoustic pulses.

The modifier means may comprise a shielding member employing magnetoelastic material having a magnetisation curve which varies significantly with applied mechanical stress, the shielding member being positioned to modify the magnetic field in the region of the magnetostrictive member due to current pulses in the conductor as the mechanical stress in the said material varies. The force receiving member is then coupled to the shielding member to vary the mechanical stress in the shielding member when the force applied to the transducer varies.

The magnetostrictive member may comprise a strip or an elongated wire or a bundle of strips or wires of magnetostrictive material such as nickel, the strip, wire or bundles usually, but not necessarily, being at right angles to the conductor in order to give longitudinal magnetic flux in the magnetostrictive member and so obtain maximum sensitivity. The wire may be of any metal exhibiting the magnetostrictive effect but it is preferably a drawn, or rolled, metal wire having a high permeability and high magnetostriction providing a delay line with a high and uniform sensitivity characteristic along its length.

The shielding member may be a ribbon of a metal alloy having high permeability which is strongly affected by stress, for example the ribbon may be of Metglas 2605SC or Vitrovac (Registered Trade Mark). The ribbon may run parallel to the conductor between the conductor and the delay line. In operation the force applied to the transducer is transferred from the force receiving member to apply tension longitudinally in the ribbon.

The above mentioned metal alloys, Metglas and Vitrovac, may also be used to form the magnetostrictive member.

The transducer may comprise two parallel conductors equally spaced from the delay line each with a sheet of magnetoelastic material between the delay line and the conductor. In such an arrangement it is preferable to arrange that force applied to the transducer partially relieved an existing tensile stress in one magnetoelastic sheet and increases an existing tensile stress in the other, so that a differential effect is produced. Thus the most non-linear parts of the response of the magnetoelastic material of the sheet may be avoided.

In an alternative form of the transducer of the first aspect of the present invention the magnetostrictive member may again comprise an elongated wire of magnetostrictive material, the conductor and the wire being at right angles but the force receiving member is, in this alternative, arranged to modify the distance between the conductor and the elongated wire in accordance with the force applied to the transducer.

When the magnetostrictive member comprises a wire, the detector means may include a coil around the wire. The detector means may then provide the said output signals as signals each representative of an interval dependent on the time a signal in the detector coil, resulting from a current pulse in the conductor, reaches a predetermined value as it increases and/or decreases.

In an alternative arrangement which provides a binary output, the conductor partially loops the elongated wire and the force receiving member is arranged to short-circuit the loop when a force greater than a predetermined threshold is applied to the transducer.

The above transducers are particularly useful in forming arrays of force transducers since common conductors can be used for the transducers in the rows of the arrays and common delay lines can be used for transducers forming columns of the array. In this case the delay lines are continuously sensitive to external magnetic field over the region coupled by the transducers. In addition the conductors can be connected in groups to use common current pulse generating means and the transducers in each column of the array may use common detector means in the form of a coil around a wire forming the delay line of the column. Thus it is seen that transducer arrays can be constructed which are economical in comparison with arrays in which transducer outputs are individually connected.

The array may be made without electrical joints in the area in which stress is applied giving an important advantage over other arrays where such joints are in the said area and often, therefore, repeatedly subject to cyclic stress. The array can be manufactured by a simple process without the need to have separate electrical joints at each transducer site.

According to a second aspect of the present invention there is provided a transducer comprising
- an acoustic delay line which is sensitive to changes in magnetic flux,
- a conductor,
- means for causing current changes in the conductor, the conductor being positioned sufficiently close to the delay line for the changes to affect acoustic waves in the delay line,
- a receiving member,
- modifier means for varying the amount by which the said changes affect the said acoustic waves in dependence upon a condition at the receiving member, and
- detector means for deriving electrical output signals having values dependent on characteristics of acoustic waves in the delay line.

For example the said condition may be temperature magnetic field, mechanical stress or displacement.

According to a third aspect of the present invention there is provided a transducer array comprising a plurality of transducers each comprising
- an acoustic delay line which is sensitive to changes in magnetic flux,
- a conductor,
- means for causing current changes in the conductor, the conductor being positioned sufficiently close to the delay line for the changes to affect acoustic waves in the delay line,
- a receiving member,
- modifier means for varying the amount by which the said changes affect the said acoustic waves in dependence upon a condition at the receiving member, and
- detector means for deriving electrical output signals having values dependent on charracteristics of acoustic waves in the delay line.

Certain embodiments of the invention will now be described by way of example, with reference to the accompanying drawings, in which.

Figure 1:
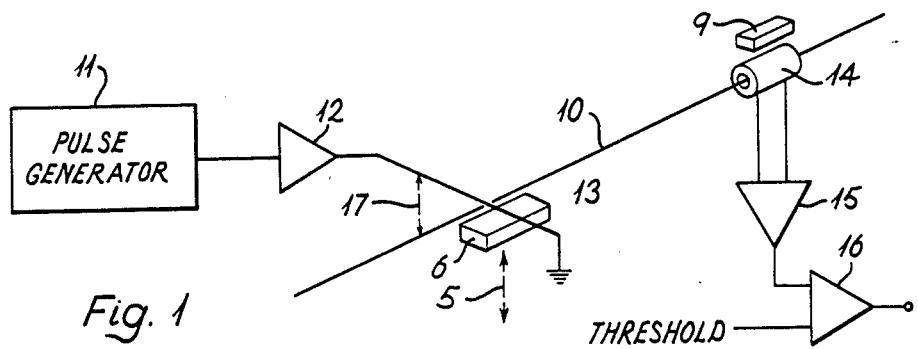
FIG. 1 is a schematic drawing of a transducer according to the invention.
Figure 7:
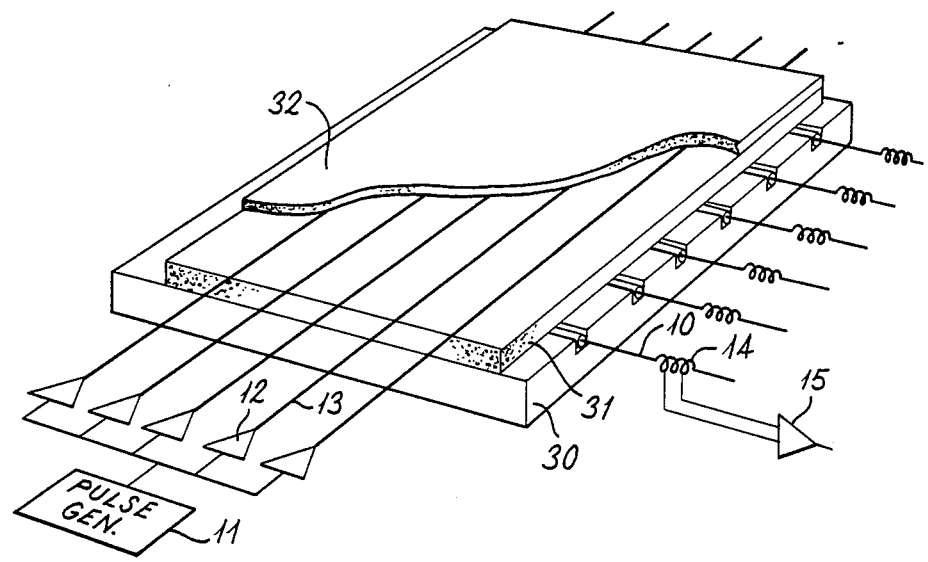
FIG. 7 is a schematic drawing of an array of transducers according to the invention.
Figure 8:
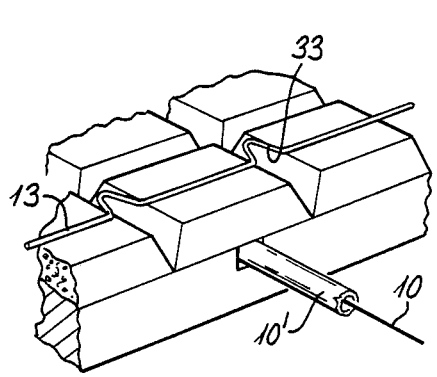
Figure 9:
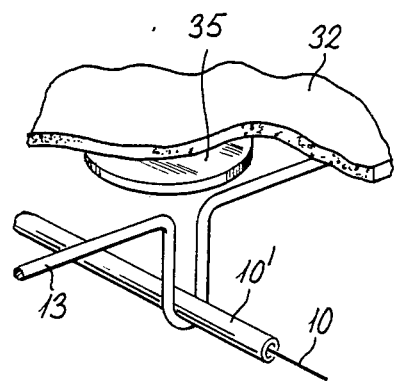
Figure 10:
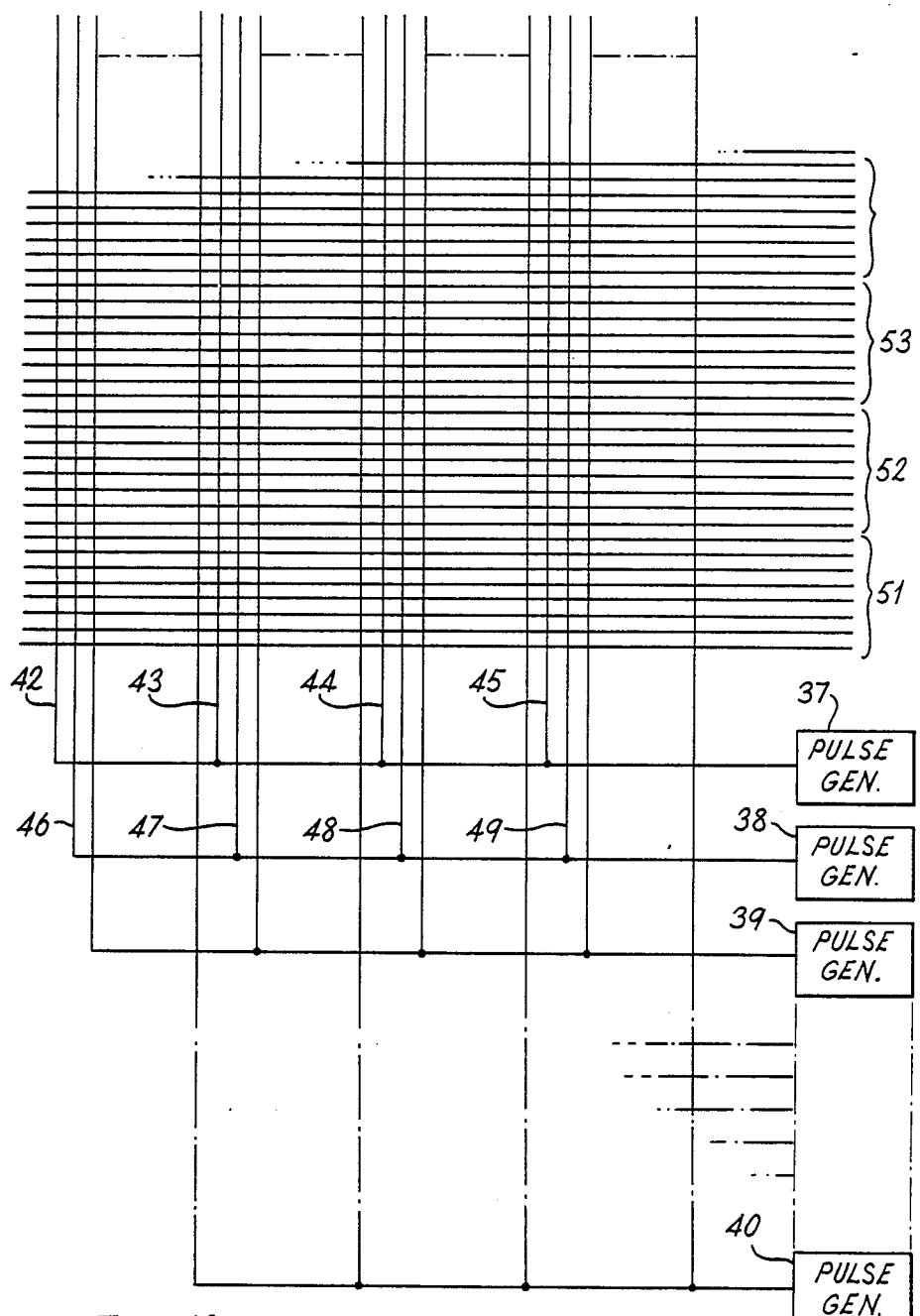
Figure 11:
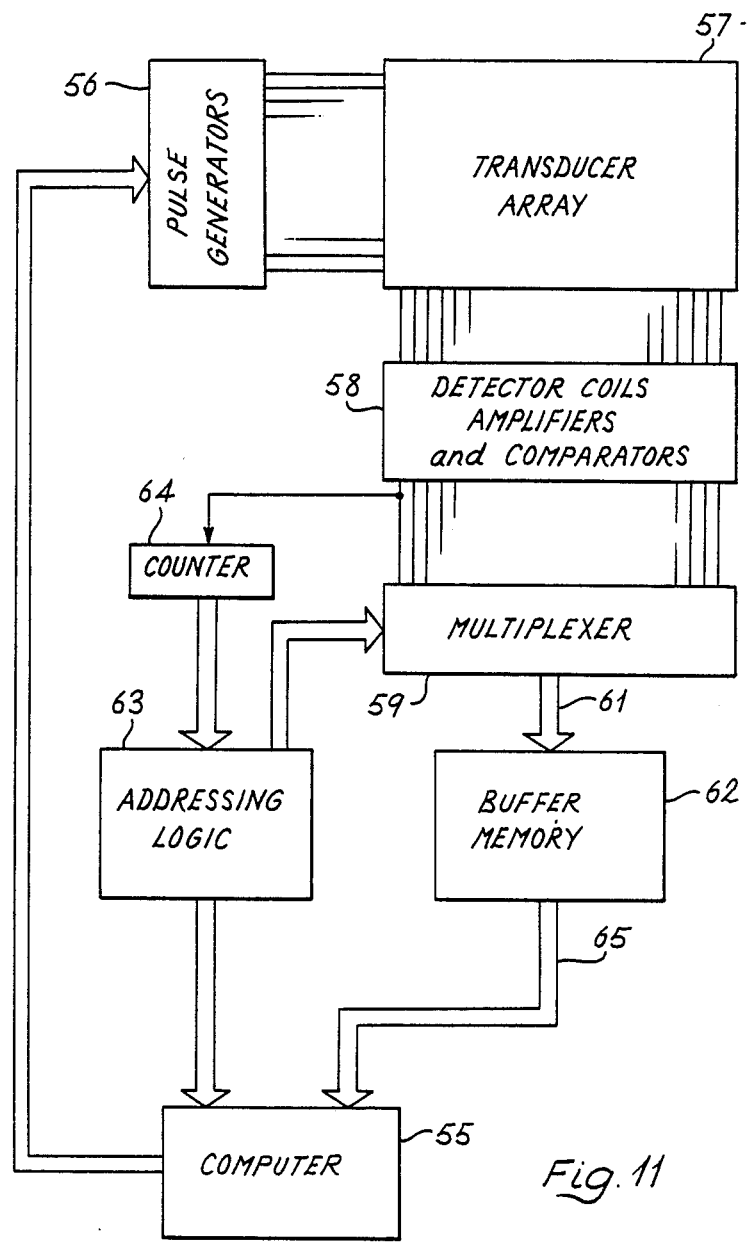

FIG. 8 is a drawing showing how the transducers of the type shown in FIG. 1 can be used in the array of FIG. 7, FIG. 9 shows a modified form of transducer of FIG. 1 according to the invention for use in the array of FIG. 7, FIG. 10 is a schematic drawing of part of the wiring of one form of an array employing transducers according to the invention, and FIG. 11 is a block diagram of a computer controlled system for operating the array of FIG. 10.

FIG. 1 shows a schematic example of a transducer employing a magnetostrictive delay line 10 consisting of a nickel wire or a strip of an amorphous magnetic alloy such as Metglas 2605SC. A pulse generator 11 generates a series of pulses which are passed by way of an an amplifier 12 to a conductor 13 in the region of the delay line and at right angles thereto. Each time a current pulse appears in the conductor 13 the resulting pulsed magnetic field generates a local stress in the delay line 10 due to the high magnetostriction constant of nickel or the amorphous magnetic alloy. Consequently an acoustic pulse passes along the wire at about 5 km/s. A detector coil 14 is wound round the wire 10 and receives a bias flux from a bar magnet 9, or equivalent. When the acoustic pulse arrives at the receiving coil 14 a voltage pulse is generated in the coil 14 due to the change in the magnetic flux applied to the coil arising from modulation of the permeability of the delay line. These voltage pulses are applied to a wide-band amplifier 15 and then to a comparator 16 which receives a threshold voltage as shown.

A smooth channel is provided to position the delay line in relation to other components of the transducer but is not shown in FIG. 1; for example a nylon tube may be used. Such a channel is preferably provided for the other transducers described in this specification and defined in the claims.

In operation as a force transducer, a distance 17 between the wire 13 and the delay line 10 is varied according to the force to be measured and as a result the amplitude of pulses received at the output of the amplifier 15 varies, since the size of the acoustic pulses in the delay line 10 depends on the distance 17. The comparator 16 is then used to provide an output only when pulses generated in the coil 14 are greater than a certain amplitude providing an indication of whether or not a force has been applied to decrease the distance 17.

In general, means are preferably required to establish a bias field at the point where the conductor crosses the delay line. This may for example be by means of a small permanent magnet 6 but in some cases can be achieved by premagnetising the delay line. These remarks apply to all the transducers described in this specification and defined in the claims.

Instead of moving the conductor in relation to the delay line the permanent magnet 6 which provides a static bias field can be moved, for example, as indicated by the arrow 5, in response to applied force and this alters the amplitude of the acoustic pulses generated.

The main application of such transducers is in economical arrays where each crossing of a delay line such as the delay line 10 by a conductor such as the conductor 13 corresponds to a point in the array. These arrays will be described in more detail later.

As described, the transducer of FIG. 1 is a binary device in that it indicates only whether a force has been applied or not. The transducer can be modified to indicate the magnitude of the force applied by replacing the comparator 16 with an analogue-to-digital converter for a digital output or by an analogue indicating device which indicates the peak magnitudes of the pulses from the amplifier 15.

Figure 2A:
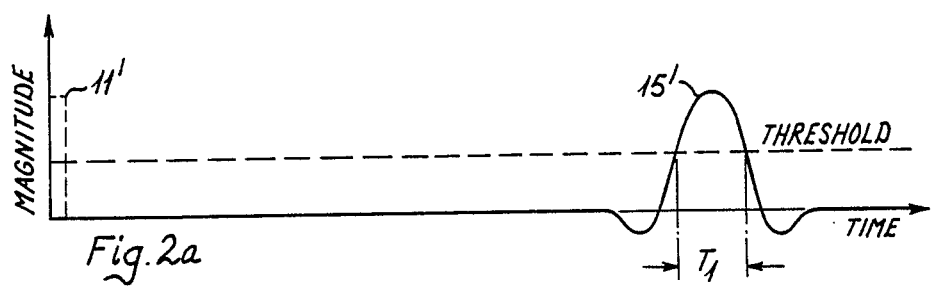
FIG. 2 shows waveforms explaining how force magnitude can be obtained from the transducer of FIG. 1.
Figure 2B:
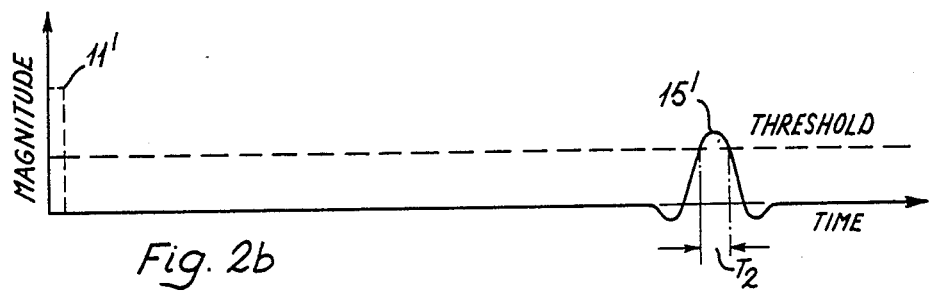

Alternatively force magnitude may be obtained by measuring the time for which each pulse from the amplifier 15 remains above the threshold. FIG. 2 shows two amplifier pulses 15' which result from pulses 11' from the generator 11. The upper waveforms show a relatively large pulse 15' resulting from a force which considerably reduces the distance 17 and the lower waveforms show a relatively small pulse due to a force which reduces the distance by a small amount. The times $T_1$ and $T_2$ for which the two pulses are above the threshold shown, provide an indication of the applied forces, and the threshold can be arranged so that when no force is applied the threshold is not crossed.

The output of the comparator 16 may be coupled as one input to a two-input AND gate (not shown) while a further pulse generator (not shown) is coupled to the other AND gate input. The output of the AND gate is coupled to a counter (not shown) so that if the pulses from the further generator are generated at a much higher rate than those from the generator 11, and the counter is reset by each pulse 11', then the maximum count reached by the counter is representative of applied force.

Force magnitude may be obtained in another way by measuring the time between the application of each pulse 11' by the generator 11 and the time the leading or trailing edge of a pulse 15' from the amplifier 15 crosses the threshold voltage of the comparator 16. However, the time to the leading edge is inversely related to the force applied to the transducer.

An alternative structure for the conductor 13 in a binary transducer is a loop which wholly or partially encloses the delay line 10 but which is short-circuited when a force is either applied to, or removed from, the transducer. Such a transducer is shown in FIG. 9.

Figure 3:
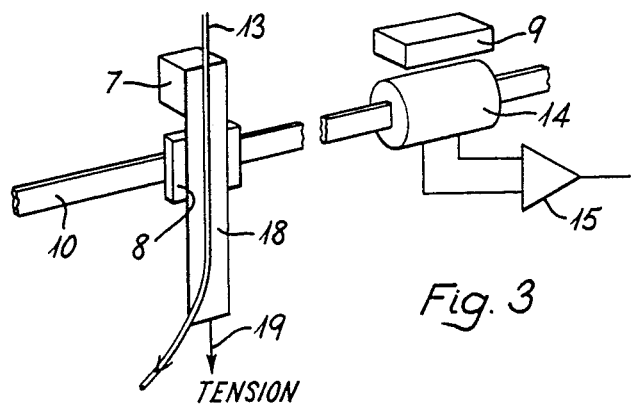
FIG. 3 is a schematic drawing of an alternative transducer according to the invention.
Figure 4:
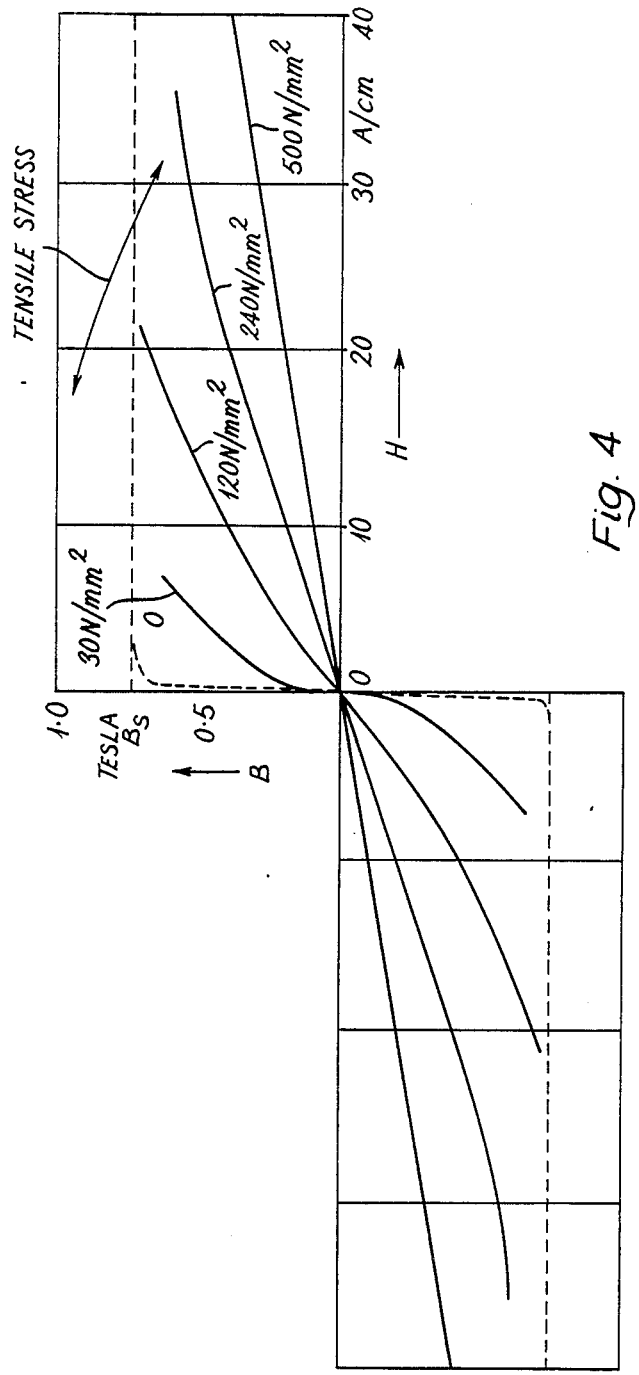
FIG. 4 is a magnetisation curve showing the effect of tension for an amorphous metallic alloy.

Another transducer is shown in FIG. 3 where, as is the case throughout this specification, those parts having the same functions have the same designations as in FIG. 1. In FIG. 3 a ribbon 18 of amorphous metal alloy ribbon such as Metglas having strong magnetoelastic characteristics is positioned between the conductor 13 and the delay line 10. The magnetisation characteristics of the ribbon material shows that permeability is very sensitive to mechanical stress (see FIG. 4 which is from "Magnetic Sensors of New Materials" by Boll and Borek, Siemens Forsch.—u. Entwickl.—Ber. Bd. 10 (1981) Nr. 2). In the unstressed condition the permeability is high and the ribbon acts as a magnetic screen between the conductor 13 and the delay line 10 but when the ribbon is stressed the permeability is greatly reduced and more flux penetrates the delay line 10 when the current pulse occurs. Thus by applying tension as indicated by the arrow 19 the amplitude of voltage pulses generated at the coil 14 is increased. The ribbon 18 is attached to a support 7 and spaced from the delay line 10 by a spacer 8 since the distance between the ribbon and the delay line must be kept constant.

In a typical example the delay line 10 is spaced by about 0.25 mm from the strip 18 and the wire 13 is an insulated copper conductor with insulation touching the strip 18. The detector coil 14 has 1,000 turns and the voltage amplification provided by the amplifier 15 is about 200. In these circumstances the peak amplitude of the pulses at the output of the amplifier 15 was approximately proportional to the stress and between 1 and 10 volts for rectangular current pulses in the conductor 13 of about 20 amps and of about 3 microsec duration. The maximum stress in the ribbon 18 was calculated very approximately as 70 Newtons/sq mm in the series of measurements giving the above values.

It may be preferable to arrange for the flux in the ribbon 18 to be in the same direction as the tension, and for this reason the ribbon 18 may be positioned parallel to the delay line 10 with tension applied parallel to the axis of the delay line.

Figure 5:
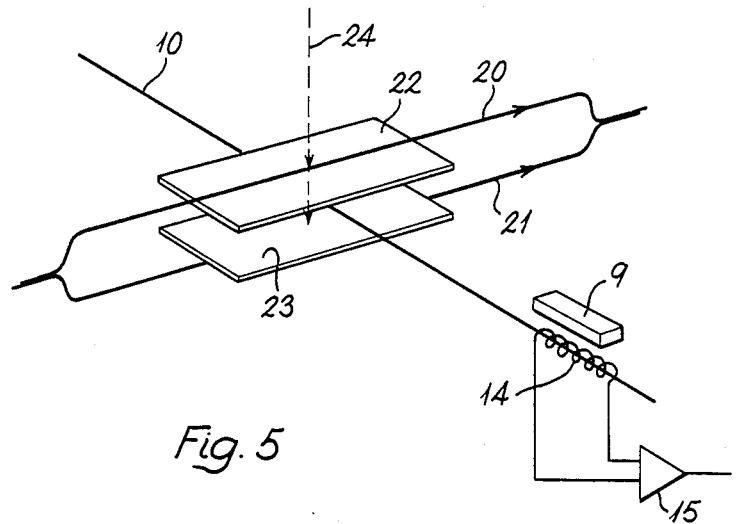
FIG. 5 is a schematic drawing of another transducer according to the invention.
Figure 6:
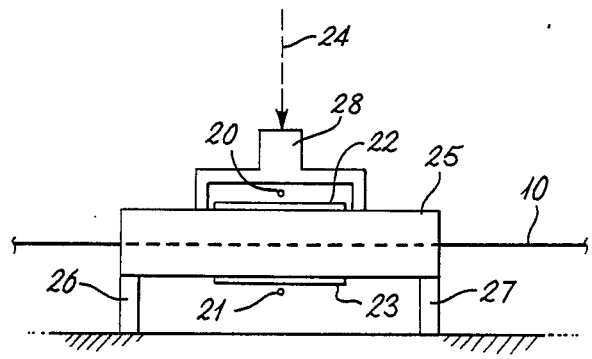
FIG. 6 is a schematic drawing showing another view of the transducer of FIG. 5.

An improved transducer employing magnetoelastic strips is shown in FIGS. 5 and 6. The pulsed conductor 13 is replaced by two parallel conductors 20 and 21 equally spaced from the delay line 10, and shielded by magnetoelastic sheets 22 and 23, respectively.

Magnetic fields due to equal currents in the conductors 20 and 21 are equal and opposite at the delay line 10 if the shielding effects of the sheets 22 and 23 are equal. Hence the net effect of the pulsed currents is zero, that is a zero amplitude acoustic pulse is generated, and thus a zero-amplitude voltage pulse appears at the expected time. However if a force to be measured is applied in the direction of the dashed arrow 24 in such a way that an existing tensile stress in the upper sheet 22 is partially relieved and an existing tensile stress in the lower sheet 23 is increased, then the shielding effect of the upper sheet becomes greater and that of the lower sheet becomes smaller with the result that the acoustic pulses generated in the delay line 10 have significant amplitude of positive or negative sign. Since this is a differential arrangement many spurious common mode effects are much reduced.

FIG. 6 shows one way in which a reduction and an increase in tension in the sheets 22 and 23 can be achieved by the application of a force. The sheets 22 and 23 are intimately fixed to the outer surfaces of a square section tube 25 which is a non-magnetic tube, made for example of aluminium, brass, copper or a ceramic. The tube encloses the delay line 10 but the conductors 20 and 21 are outside. Supports 26 and 27 support the ends of the tube and force is applied in the direction shown by the arrow 24 by way of a bridge member 28 which bridges the sheet 22 and applies the load over a fairly wide area. The tube 25 is prestressed (by means not shown) so that both its upper and lower surfaces in the region of the sheets 22 and 23 are in tension, for example, by means of a hollow longitudinal bolt inside the tube 25 and arranged by means of suitable terminations to apply tension to the tube. Prestressing may be achieved by applying longitudinal tension to the tube. The application of the force in the direction of the arrow 24 then causes a decrease in the tensile stress in the upper surface of the tube 25 and an increase in the tensile stress in the lower surface.

Other types of differential transducers according to the invention include transducers similar to those of FIG. 5 but without the sheets 22 and 23 and with an additional member comprising magnetic material, such as Mumetal or ferrite. The additional member, which may be disc shaped, is positioned above the conductor 20 (as seen in FIG. 5) and when a force is applied to the transducer moves towards this conductor upsetting the balanced arrangement and generating acoustic pulses in the delay line. Alternatively two such additional members may be used which nominally form a symmetrical structure and the transducer input causes movement of one or both additional members.

Alternatively transducers similar to those of FIG. 5 but without the sheets 22 and 23 may simply allow the positions of the conductors 20 and 21 to vary in relation to the delay line 10 on the application of a force. The conductors may then be supported by resilient layers while protection from stress is provided for the delay line.

As has been mentioned force transducers for example of the types shown in FIGS. 1, 3, 5 and 6 and related transducers can be usefully arranged in arrays to allow the distribution of forces over two dimensional areas to be measured and/or compared.

An example of such an array is shown in FIG. 7 where a number of nickel wire delay lines, one of which is designated 10, are positioned parallel to one another, in respective grooves in a base member 30, and separated by a distance of, for example, 10 mm. Each of these wires has a detection coil, one of which is designated 14, connected to an amplifier 15. The magnets 9 are also present but, for clarity of the drawing, are not shown in FIG. 7. Parallel conductors are positioned at right angles to the delay lines and separated from them by a compressible layer 31. The whole arrangement is covered by a flexible layer 32.

In this arrangement the transducers are of the type shown in FIG. 1 since when a pressure distribution is applied to the top of the layer 32 the compressible layer 31 compresses by different amounts according to the pressure distribution reducing the distance between the conductors and the delay lines according to the distribution. Since the delay lines are positioned in grooves, they are protected from the applied pressure distribution. This is importance since pressure would change the acoustic properties of the delay lines.

In order to localise each transducer so that its output is independent of forces applied to neighbouring transducers the construction at each cross-over may be as shown in FIG. 8 where the conductors 13 are supported by islands of compressible material, one for each cross-over, and each conductor is provided with partial loops 33 where it crosses grooves between islands. The delay lines 10 are located in protective nylon tubes 10'.

One way of constructing transducers, mentioned above, is to arrange for the conductors to loop partially round the delay lines. The partial loops are then short-circuited on the application of pressure. Such an arrangement is outlined in FIG. 9 where a circular conductor 35 is normally spaced from the conductor 13. When a force is applied to the layer 32 in the region of the circular conductor 35, this conductor contacts the ends of the partial loop and short-circuits the partial loop so that the amplitude of acoustic pulses in the delay line 10 is greatly reduced. The conductor 35 and similar conductors for the other transducers in the array may, for example, be etched by circuit board manufacturing techniques from a conductive layer on a backing insulating sheet.

In practice it is found that each acoustic pulse occupies about 5 cm of the wire 10 so that in order to obtain discrete output pulses from the amplifier 15 those conductors which are simultaneously excited must be separated by at least 5 cm, 8 cm being chosen in practice. However in order to give the same resolution in both dimensions of the array, parallel conductors must be provided which are the same distance apart as the delay lines, that is 10 mm. This is achieved by connecting the conductors in interleaved groups as indicated in FIG. 10. Before describing FIG. 10 in more detail, one other phenomenon will be mentioned. On reaching the ends of the delay lines the acoustic pulses are reflected and thus a single pulse in one of the parallel conductors tends to cause a reverberation which may last for many transits along the delay line 10. To interrogate repetitively it is necessary to wait until this activity has died away before generating another pulse in the delay line. Thus an interval is required before more pulses may be generated in the parallel conductors. In order to achieve maximum interrogation rate, damping structures are required to reduce reflection at the ends of the delay lines 10 to a very low level. Nearly any form of coating at the ends of the conductors can be used for damping but, in particular to avoid further reflections, the coating must be applied without forming an abrupt discontinuity. Materials which may be used include latex or a deposited tapered metal layer such as a lead layer. In practice reflections can be made insignificant within about three transit times, that is about 33 mS for delay lines 5 m in length, thus allowing a maximum sampling rate of 330 interrogations per second.

Eight pulse generators are used, by way of example, in the array of FIG. 10, although a single pulse generator and a de-multiplexer is an alternative. Only the first three of these generators (37, 38 and 39) and the last (the generator 40) are shown. Each pulse generator is connected to a number of the parallel conductors, for example the generator 37 is connected to the conductors 42 to 45, and these conductors are spaced by 8 cm. The next pulse generator 38 is connected to a group of conductors 46 to 49 which are interleaved with the conductors connected to the generator 38, corresponding conductors in the two groups being separated by one centimeter. Conductors in the other groups are similarly spaced from those of neighbouring groups and in this way eight groups of conductors are formed, each with its conductors connected to one of the pulse generators.

In operation the pulse generators are triggered in turn, the interval between triggering being 3 mS but each pulse generator producing n samples each 3 mS where n is the number of conductors in each of the groups.

The delay lines can conveniently be connected in groups of eight, such as the groups 51, 52 and 53, and where the transducers are, for example, of the binary form shown in FIG. 9, each group of eight delay lines can be regarded as giving rise to a single byte of data each time one of the conductors crossing that group of delay lines is pulsed. Thus for example a single pulse from the generator 37 generates four successive bytes from the group of delay lines 51, one from each of the conductors 42 to 45, and four successive bytes from each of the other groups of delay lines 52, 53 and so on.

An array 57 such as that of FIG. 10 may be controlled by a computer 55 as shown in FIG. 11. The computer initiates an interrogation cycle on a selected pulse generator in a group 56, which comprises the pulse generators of FIG. 10 by sending out a channel number. This number selects one of the pulse generators and a group of conductors in the array 57 is pulsed. As a result a series of acoustic pulses appears on each one of the delay lines of the array and passes to a detector, amplifier and comparator, for example as shown in FIG. 1. These outputs are grouped into sets of eight to form data bytes and applied to a multiplexer 59. Since the acoustic pulses are of comparatively long duration, the bytes in the multiplexer can be read serially along an eight bit bus 61 into a buffer memory 62 while the outputs from the comparators remain at steady values. Addressing the buffer memory 62 is under the control of logic 63 which receives an eight bit input from a counter 64. Each time a pulse generator provides an output, the addressing logic serially addresses each byte location in a group of byte locations determined by the address received from the counter 64. The data bytes from the multiplexer 59 are then read serially at relatively high speed into these locations. The counter 64 is incremented by pulses from a reference delay line so that successive pulses in the series of pulses are allocated so further subdivisions of memory.

When each pulse generator has been triggered the buffer memory 62 holds a complete output from the array giving binary data for each transducer. The buffer memory can then be read by way of a bus 65 into a screen memory held by the computer and controlling a display. Thus the display is a binary interpretation of the load distribution on the array and the data can be used for other computational purposes.

Where it is required to obtain an indication of the magnitude of the pressure applied at each transducer in the array then the comparators of FIG. 1 and in the group 58 of FIG. 11 are replaced by analogue-to-digital converters whose output is read into the multiplexer 59. Alternatively the "delay" method of obtaining force magnitude described in connection with FIG. 2 may be used. Each connection to the multiplexer (corresponding to one of the delay lines) now has a number of data bits representing pressure, for example one byte. Thus the multiplexer, the addressing logic and the counter need to be modified accordingly.

It may be necessary in some cases in order to give more time for data input to the computer, for the detector coils on the delay lines to be at differing distances from the edge of the array so that the series of pulses which are produced from each amplifier 15 falls within an overall series of pulses distributed in a read-out cycle initiated by a pulse from one pulse generator.

It will be evident that the invention can be put into practice in many other ways than those specifically described above. In particular, current changes in other forms than rectangular pulses may be used in the conductors of the transducers and the transducers may respond to other input conditions than force or change in force.

I claim:

1. A force transducer comprising
a magnetostrictive member which, in operation, acts as an acoustic delay line and is sensitive to changes in magnetic flux,
a conductor,
means for generating current pulses in the conductor, the conductor being positioned sufficiently close to the magnetostrictive member to cause an acoustic pulse to be launched in the magnetostrictive member each time one of the said current pulses is generated,
a force receiving member,
modifier means for varying the amplitudes of the acoustic pulses in dependence upon force applied to the force receiving member, and
detector means for deriving electrical output signals having values dependent on the amplitudes of the acoustic pulses.

2. A transducer according to claim 1 wherein the modifier means comprises
a shielding member employing material having a magnetization curve which varies significantly with applied mechanical stress,
the shielding member being positioned to modify the magnetic field in the region of the magnetostrictive member due to current pulses in the conductor as the mechanical stress in the said material varies, and
the force receiving member being coupled to the shielding member to vary the said mechanical stress when force applied to the force receiving member varies.

3. A transducer according to claim 2 wherein
the magnetostrictive comprises at least one elongated strip or wire of magnetostrictive material,
the conductor and the strip or wire are at right angles to one another, and
the shielding member comprises a sheet of the said material interposed between the conductor and the strip or wire.

4. A transducer according to claim 3 wherein
the said sheet is an elongated ribbon, and
the force receiving member, in operation, tensions the ribbon longitudinally.

5. A transducer according to claim 3 comprising
a further conductor parallel to the other conductor, and
a further shielding member comprising a sheet of the said material interposed between the further conductor and the said elongated strip or wire,
the two conductors being on either side of the said elongated wire at equal distances therefrom,
the two shielding members being on either side of the said elongated wire at equal distances therefrom, and
the modifier means being arranged to relieve, partially, an existing tensile stress in one shielding member and to increase an existing tensile stress in the other shielding member when force is applied to the force receiving member.

6. A transducer according to claim 2 wherein the said material is chosen from the group comprising:
a metal alloy having high permeability which is strongly affected by stress,
Metglas 2605SC, and
Vitrovac (Registered Trade Mark).

7. A transducer according to claim 1 wherein
the modifier means is arranged to vary the distance between the conductor and the magnetostrictive member in response to force applied to the force receiving member.

8. A transducer according to claim 7 wherein
the magnetostrictive member comprises at least one elongated strip or wire of magnetostrictive material,
the conductor and the strip or wire are at right angles to one another, and
the modifier means comprises resilient means between the conductor and the strip or wire.

9. A transducer according to claim 1 comprising
a further conductor parallel to the said conductor, and wherein
the magnetostrictive member comprises at least one elongated strip or wire of magnetostrictive material,
the two conductors are on either side of the said elongated wire or strip and, in a datum position, at equal distances therefrom, and
the modifier means is arranged to increase the distance between one of the conductors and the strip or wire and to decrease the distance between the other of the conductors and the strip or wire in response to forces applied to the force receiving member.

10. A transducer according to claim 1 comprising
a further conductor parallel to the said conductor, and wherein
the magnetostrictive member comprises at least one elongated strip or wire of magnetostrictive material,
the two conductors are on either side of the said elongated wire or strip at equal distances therefrom,
the modifier means comprises magnetic material which is positioned on that side of one of the said conductors which is remote from the other conductor, and
the force receiving member is arranged to vary the distance between the magnetic material and the said one conductor in response to forces applied to the force receiving member.

11. A transducer according to claim 10 wherein
the modifier means comprises further magnetic material which, in a datum position, forms a symmetrical arrangement with the other said magnetic material with respect to the magnetostrictive member and the conductors.

12. A transducer according to claim 1 wherein
the magnetostrictive member comprises at least one elongated strip or wire of magnetostrictive material,
the conductor and the strip or wire are at right angles to one another with the conductor forming at least a partial loop around the strip or wire, and
the modifier means includes a conductive member arranged to short-circuit the said loop in response to force applied to the force receiving member.

13. A transducer according to claim 1 wherein
the magnetostrictive member comprises at least one elongated strip or wire of magnetostrictive material,
the conductor and the strip or wire are at right angles to one another, and
the detector means comprises a detector coil around the strip or wire and means for applying a magnetic flux longitudinally of the strip or wire in the region surrounded by the coil.

14. A transducer according to claim 1 wherein the detector means comprises
means for deriving electrical pulses representative of respective acoustic pulses, and
means for obtaining signals each representative of an interval dependent on the time at which one of the said electrical pulses reaches a predetermined level either as its level increases and/or decreases.

15. A transducer according to claim 14 wherein the means for obtaining signals representative of the said intervals comprises means for obtaining an indication of the interval for which each of the said pulses representative of an acoustic pulse has a magnitude greater than a threshold magnitude.

16. A transducer according to claim 1 wherein
the modifier means comprises a magnet in the vicinity of the magnetostrictive member, and
the force receiving member is arranged to vary the distance between the magnet and the magnetostrictive member in response to applied force.

17. A transducer according to claim 1 including means for applying a magnetic bias field to the magnetostrictive member where the conductor is adjacent thereto.

18. A force transducer array comprising a plurality of force transducers each comprising
a magnetostrictive member which, in operation, acts as an acoustic delay line and is sensitive to changes in magnetic flux,
a conductor,
means for generating current pulses in the conductor, the conductor being positioned sufficiently close to the magnetostrictive member to cause an acoustic pulse to be launched in the magnetostrictive member each time one of the said current pulses is generated,
a force receiving member,
modifier means for varying the amplitudes of the acoustic pulses in dependence upon force applied to the force receiving member, and
detector means for deriving electrical output signals having values dependent on the amplitudes of the acoustic pulses.

19. A transducer array according to claim 18 wherein
the array is a planar array,
the force transducers in the array are arranged in rows and columns,
the magnetostrictive members of the transducers in each row comprise at least one common elongated strip or wire of magnetostrictive material particular to that row,
the conductors of the transducers in each column comprise a single common conductor, particular to that column, and
the said strips or wires are parallel to one another and at right angles to the said conductors which are also parallel to one another.

20. A transducer array according to claim 19 wherein
the modifier means of each transducer comprises a first common resilient layer between the conductors and the strips or wires,
the force receiving means of each transducer comprises a second common resilient layer which when deformed in a region approximately equal to the area of one of the transducers, deforms the first common resilient layer over an approximately equal corresponding area, and
means are provided for protecting the strips or wires from stress due to forces applied to the force receiving means.

21. A transducer array according to claim 19 wherein
the force receiving meas of each transducer comprises a common resilient layer, and
wherein in each transducer
the conductor forms at least a partial loop round the wire, and
the modifier means includes a conductive member arranged to short-circuit the said loop in response to force applied to the common resilient layer in the vicinity of that transducer.

22. A transducer array according to claim 19 wherein
the common conductors are equally spaced,
the common conductors are arranged in groups with the distance between the conductors in each group greater than the distance occupied by an acoustic pulse in each of the common strips or wires,
the groups of conductors are arranged in a series with the distance between the conductors of each group and those of the next group in the series being the distance between the conductors of each group divided by the number of groups.

23. A transducer array according to claim 21 wherein the means for generating current pulses in each transducer comprises a common pulse generator for all the transducers having common conductors connected in one said group, the common pulse generator being connected to the conductors of those transducers, and the detector means in each transducer comprises a common detector coil for all the transducers having a common said magnetostrictive wire, the common detector coil being located around the said wire of those transducers.

24. A transducer array according to claim 18 wherein each tranducer includes means for applying a magnetic bias field to the magnetostrictive member where the conductor is adjacent thereto.

* * * * *